United States Patent
Lee et al.

(10) Patent No.: US 11,427,683 B2
(45) Date of Patent: Aug. 30, 2022

(54) PREPARATION METHOD OF POLYARYLENE SULFIDE

(71) Applicant: LG CHEM, LTD., Seoul (KR)

(72) Inventors: Jeongbin Lee, Daejeon (KR); Joong Jin Han, Daejeon (KR); Eunju Park, Daejeon (KR); Sanghwan Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 7 days.

(21) Appl. No.: 17/049,265

(22) PCT Filed: Jul. 4, 2019

(86) PCT No.: PCT/KR2019/008212
§ 371 (c)(1),
(2) Date: Oct. 20, 2020

(87) PCT Pub. No.: WO2020/009495
PCT Pub. Date: Jan. 9, 2020

(65) Prior Publication Data
US 2021/0238355 A1 Aug. 5, 2021

(30) Foreign Application Priority Data

Jul. 4, 2018 (KR) .......... 10-2018-0077926
Jul. 3, 2019 (KR) .......... 10-2019-0080238

(51) Int. Cl.
*C08G 75/0281* (2016.01)
*C08G 75/0236* (2016.01)
*C08G 75/0254* (2016.01)

(52) U.S. Cl.
CPC ..... *C08G 75/0281* (2013.01); *C08G 75/0236* (2013.01); *C08G 75/0254* (2013.01)

(58) Field of Classification Search
CPC .......... C08G 75/14; C08G 75/0263; C08G 75/0268; C08G 75/0259; C08G 75/025; C08G 75/0281
See application file for complete search history.

(56) References Cited

U.S. PATENT DOCUMENTS

| | | | |
|---|---|---|---|
| 4,645,826 A | 2/1987 | Iizuka et al. | |
| 4,730,034 A | 3/1988 | Nesheiwat et al. | |
| 5,031,822 A | 5/1991 | Drake | |
| 5,126,430 A * | 6/1992 | Senga | C08G 75/025 528/226 |
| 5,380,821 A | 1/1995 | Dournel et al. | |
| 5,744,576 A | 4/1998 | Miyahara et al. | |
| 8,609,790 B2 | 12/2013 | Suzuki et al. | |

(Continued)

FOREIGN PATENT DOCUMENTS

| | | |
|---|---|---|
| EP | 0302218 A1 | 2/1989 |
| EP | 3473660 A2 | 4/2019 |

(Continued)

OTHER PUBLICATIONS

Fahey, et al. Mechanism of Poly(@-phenylene sulfide) Growth from p-Dichlorobenzene and Sodium Sulfide. Macromolecules, vol. 24, pp. 4242-4249 (1991).

*Primary Examiner* — Shane Fang
(74) *Attorney, Agent, or Firm* — Dentons US LLP

(57) ABSTRACT

A preparation method of a polyarylene sulfide that may produce a polyarylene sulfide having properties equal to or higher than those of the conventional method with a high molecular weight at a high yield by optimizing the content and molar ratio of an amide-based compound in a polymerization step.

13 Claims, 1 Drawing Sheet

(56) References Cited

U.S. PATENT DOCUMENTS

| | | |
|---|---|---|
| 2005/0043505 A1 | 2/2005 | Horiuchi et al. |
| 2006/0074219 A1 | 4/2006 | Kawama et al. |
| 2010/0210813 A1 | 8/2010 | Foder et al. |
| 2015/0344632 A1 | 12/2015 | Chen et al. |
| 2016/0237216 A1 | 8/2016 | Konno et al. |
| 2016/0244612 A1* | 8/2016 | Unohara ................ C08L 23/02 |
| 2017/0137573 A1 | 5/2017 | Suzuki et al. |
| 2018/0171078 A1 | 6/2018 | Kimura et al. |
| 2020/0181330 A1 | 6/2020 | Jung et al. |

FOREIGN PATENT DOCUMENTS

| | | |
|---|---|---|
| JP | 02302436 A | 12/1990 |
| JP | 6-43491 B2 | 6/1994 |
| JP | H06-157757 A | 6/1994 |
| JP | H08-183858 A | 7/1996 |
| JP | 03190928 A | 8/1997 |
| JP | 2003246858 A | 9/2003 |
| JP | 2003268105 A | 9/2003 |
| JP | 2008-260858 A | 10/2008 |
| JP | 2008-285596 A | 11/2008 |
| JP | 2010-106179 A | 5/2010 |
| JP | 5623277 B2 | 11/2014 |
| KR | 10-2011-0118780 A | 11/2011 |
| KR | 10-2015-0104096 A | 9/2015 |
| KR | 10-2016-0058854 A | 5/2016 |
| KR | 10-2016-0127831 A | 11/2016 |
| KR | 10-2018-0004229 A | 1/2018 |
| KR | 10-2018-0053974 A | 5/2018 |
| KR | 10-2018-0074566 A | 7/2018 |
| WO | 2018-117426 A2 | 6/2018 |

* cited by examiner

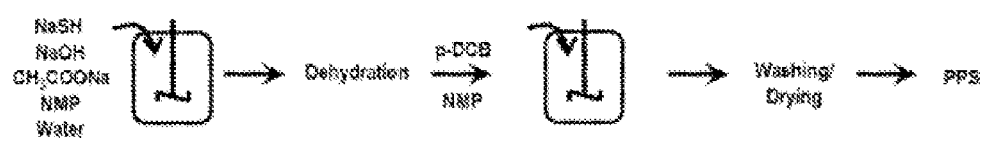

PREPARATION METHOD OF POLYARYLENE SULFIDE

The present application is a National Phase entry pursuant to 35 U.S.C. § 371 of International Application No. PCT/KR2019/008212 filed on Jul. 4, 2019, and claims priority to and the benefit of Korean Patent Applications No. 10-2018-0077926 filed on Jul. 4, 2018 and No. 10-2019-0080238 filed on Jul. 3, 2019 with the Korean Intellectual Property Office, the disclosures of which are incorporated herein by reference in their entirety.

FIELD

The present disclosure relates to a method of preparing a polyarylene sulfide exhibiting excellent strength, heat resistance, flame retardancy, and processability when processed into a molded product at a high yield.

BACKGROUND

Polyarylene sulfide (PAS), which is represented by polyphenylene sulfide (PPS), has been widely used in automobiles, electrical and electronic products, machinery and the like to replace metals, especially die cast metals such as aluminum and zinc, due to its excellent strength, heat resistance, flame retardancy, and processability. Particularly, since the PPS resin has excellent flowability, it is suitable for use as a compound by kneading with a filler such as glass fiber or a reinforcing agent.

Generally, PAS is prepared by polymerizing a sulfur source and a dihalogenated aromatic compound in the presence of an amide-based compound such as N-methyl pyrrolidone (NMP). A molecular weight modifier such as an alkali metal salt may optionally be further used.

As PAS is widely used for various purposes, particularly as a molded product by melt-processing, PAS having excellent product characteristics and moldability such as a high degree of polymerization, specifically high melt viscosity, is required. Along with the increase in demand for PAS, it is also required to improve yield in the preparation of PAS. For example, Japanese Patent No. 5623277 discloses a production process of a granular PAS including a step of adding an aromatic compound such as a dihalo aromatic compound and a trihaloaromatic compound to a liquid phase in a polymerization reaction system after a phase-separation polymerization process, and a step of cooling the liquid phase. This process can produce the granular PAS at a high yield while maintaining the melt viscosity at a high level. There has been a demand for a method capable of further improving the yield of PAS having a high degree of polymerization.

Therefore, in the process for preparing a polyarylene sulfide in which a sulfur source and a dihalogenated aromatic compound are subjected to a polymerization reaction in the presence of an amide-based compound, research on a method of preparing a polyarylene sulfide having a high degree of polymerization at a high yield is required.

SUMMARY

The present disclosure is to provide a method of preparing a polyarylene sulfide having excellent strength, heat resistance, flame retardancy, processability, and the like at a high yield by additionally adding an amide-based compound in an optimum amount in a polymerization process after dehydration.

According to an embodiment of the present disclosure, there is provided a process for preparing a polyarylene sulfide, including: a first step of preparing a sulfur source including dehydrating a hydrosulfide of an alkali metal and a hydroxide of an alkali metal in the presence of an organic acid salt of an alkali metal in a mixed solvent of water and an amide-based compound; and a second step of preparing a polyarylene sulfide by adding a dihalogenated aromatic compound and an amide-based compound to a reactor containing the sulfur source and performing a polymerization reaction; wherein the amide-based compound is used in an amount of 1.0 to 2.0 equivalents based on 1 equivalent of the hydrosulfide of an alkali metal in the second step, and a molar ratio of water to the amide-based compound present in the polymerization reaction system of the second step is 0.5 to 0.85.

In the present disclosure, the polyarylene sulfide may be produced at a yield of about 80% or more, and may have a melt flow rate (MFR) of 200 g/10 min to 1000 g/10 min measured under a load of 5 kg in accordance with ASTM D 1238-10.

As described above, the present disclosure has an excellent effect of preparing a polyarylene sulfide having excellent strength, heat resistance, flame retardancy, processability, and the like, at a high yield, by additionally adding an amide-based compound in an optimum amount in a polymerization process of the second step.

BRIEF DESCRIPTION OF THE DRAWING

The FIGURE is a schematic view of a process for preparing a polyarylene sulfide of Example 1 according to an embodiment of the present disclosure.

DETAILED DESCRIPTION

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

According to an embodiment of the present disclosure, there is provided a process for preparing a polyarylene sulfide by polymerizing a sulfur source with a dihalogenated aromatic compound, and this method prepares a polyarylene sulfide having a high degree of polymerization at a high yield by additionally adding an amide-based compound with the optimum content and molar ratio in a polymerization process of the second step.

This process for preparing a polyarylene sulfide includes a first step of preparing a sulfur source including dehydrating a hydrosulfide of an alkali metal and a hydroxide of an alkali metal in the presence of an organic acid salt of an alkali metal in a mixed solvent of water and an amide-based compound; and a second step of preparing a polyarylene sulfide by adding a dihalogenated aromatic compound and an amide-based compound to a reactor containing the sulfur source and performing a polymerization reaction.

Herein, the present disclosure is characterized in that an amide-based compound is used in the second step in an amount of 1.0 to 2.0 equivalents based on 1 equivalent of the hydrosulfide of an alkali metal, and after the addition of the amide-based compound, a molar ratio of water to the amide-based compound present in the polymerization reaction system of the second step is optimized to 0.5 to 0.85 in the polymerization reaction of reacting a sulfur source prepared by dehydration using a hydrosulfide of an alkali metal and the like with a dihalogenated aromatic compound to prepare a polyarylene sulfide.

In particular, the present disclosure may significantly increase the yield of the resulting polyarylene sulfide by adding the amide-based compound in a predetermined amount. In addition, the present disclosure may easily prepare a polyarylene sulfide capable of providing a final polymer product having a thermal property equivalent to or higher than that of the conventional polymer product. Further, the process for preparing a polyarylene sulfide of the present disclosure can also improve the yield and increase the amount of the final product.

Moreover, it was not known exactly what factors control the molecular weight and improve the yield when preparing polyarylene sulfide resins in the past, but the present inventors have conducted various experiments on main factors that greatly affect the molecular weight and yield among various process factors, thereby completing the present invention. In particular, the present disclosure may prepare a polyarylene sulfide having a high degree of polymerization with a high molecular weight at an excellent yield by closely identifying how various reaction factors change depending on the content of the amide-based compound added in the polymerization process, thereby obtaining an excellent effect of improving economic efficiency.

First, the process for preparing a polyarylene sulfide according to an embodiment of the present disclosure will be described in each step.

The above-described first step is preparing a sulfur source.

The sulfur source is prepared by dehydrating a hydrosulfide of an alkali metal and a hydroxide of an alkali metal in the presence of an organic acid salt of an alkali metal in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

Thereafter, in the present disclosure, a polyarylene sulfide is prepared at a high yield by continuously polymerizing the sulfur source, a dihalogenated aromatic compound and an amide-based compound.

The sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrogen sulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide and the like, and any one or a mixture of two or more thereof may be used. The hydroxide of an alkali metal may be used in an amount of about 0.90 to about 2.0 equivalents, more specifically about 1.0 to about 1.5 equivalents, and more particularly about 1.0 to about 1.1 equivalents, based on 1 equivalent of the hydrosulfide of an alkali metal.

In the present disclosure, the equivalent refers to molar equivalent (eq/mol).

Further, in the preparation of the sulfur source by the reaction of the hydrosulfide of an alkali metal with the hydroxide of an alkali metal, an organic acid salt of an alkali metal is added together as a polymerization assistant to promote the polymerization reaction and increase the degree of polymerization of a polyarylene sulfide in a short period of time. Specific examples of the organic acid salt of an alkali metal include lithium acetate, sodium acetate, and the like, and any one or a mixture of two or more thereof may be used. In addition, the organic acid salt of an alkali metal may be used in an amount of about 0.01 equivalents or more, about 0.05 equivalents or more, about 0.1 equivalents or more, about 0.18 equivalents or more, or about 0.23 equivalents or more, based on 1 equivalent of the hydrosulfide of an alkali metal, in order to increase the degree of polymerization of a polyarylene sulfide. However, considering that the organic acid salt of an alkali metal is a polymerization assistant that functions as a catalyst and is a factor of increase in manufacturing cost when used in excess, it is preferably used in an amount of about 1.0 equivalent or less, about 0.8 equivalents or less, about 0.6 equivalents or less, about 0.5 equivalents or less, or about 0.45 equivalents or less.

The reaction between the hydrosulfide of an alkali metal and the hydroxide of an alkali metal may be carried out in a mixed solvent of water and an amide-based compound. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam; imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), considering a reaction efficiency and a co-solvent effect as a polymerization solvent for preparing a polyarylene sulfide.

The amide-based compound may be used in an amount of about 1.0 to 2.0 equivalents, about 1.3 to 2.0 equivalents, or about 1.35 to 1.65 equivalents based on 1 equivalent of the hydrosulfide of an alkali metal in the first step. In the first step, the content of the amide-based compound may be in the above-described range to effectively form a compound with the sulfur compound formed through the dehydration process, thereby effectively performing the polymerization process.

The water may be used in an amount of about 1 to 8 equivalents, specifically about 1.5 to 5 equivalents, and more specifically about 2.5 to 4.5 equivalents, based on 1 equivalent of the amide-based compound in the first step.

Meanwhile, in the first step, a sulfide of an alkali metal may be prepared by dehydrating reactants containing a hydrosulfide of an alkali metal, a hydroxide of an alkali metal and the like. Herein, the dehydration reaction may be performed by stirring at about 100 to 500 rpm at a temperature of about 130° C. to 220° C. More specifically, the dehydration reaction may be performed by stirring at about 100 rpm to 300 rpm at a temperature of about 175° C. to 215° C. At this time, the dehydration reaction may be performed for about 30 minutes to 6 hours, or about 1 hour to 3 hours.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas. At this time, a hydroxide of an alkali metal having the same number of moles as the hydrogen sulfide may be generated.

Particularly, a dehydration liquid removed during the dehydration reaction in the first step, that is, a dehydration liquid removed to the outside during the dehydration reaction may contain about 25% to about 35% (v/v), or about 28% to about 32% (v/v) of the amide-based compound based on a total volume of the entire mixture containing the mixed solvent of water and an amide-based compound.

As a result of the reaction of the hydrosulfide of an alkali metal, the hydroxide of an alkali metal and the alkali metal salt, a sulfide of an alkali metal is precipitated in a solid phase in a mixed solvent of water and an amide-based compound. And some unreacted hydrosulfide of an alkali metal may remain in the reaction system. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a total molar ratio of the sulfide of an alkali metal precipitated as a result of the reaction, and the unreacted hydrosulfide of an alkali metal.

Subsequently, a dehydration process may be further performed in order to remove a solvent such as water from the reaction product including the sulfide of an alkali metal prepared by the above reaction. The dehydration process may be performed according to methods well known in the art, so the conditions are not particularly limited, and specific process conditions are as described above.

Further, during the dehydration reaction, the sulfur contained in the sulfur source, which remains in the hydrosulfide of an alkali metal introduced as the sulfur-containing reactant in the system, reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the sulfur source introduced as a reactant, which is the hydrosulfide of an alkali metal introduced as the sulfur-containing reactant, minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction may be carried out until the molar ratio of water to 1 mol of effective sulfur is about 1 to 5, specifically about 1.5 to 4, more specifically about 1.75 to 3.5. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of about 1.75 to 3.5, based on 1 mol of sulfur contained in the sulfur source. In addition, the sulfur source may further include a hydroxide of an alkali metal prepared by the reaction of sulfur with water.

According to an embodiment of the present disclosure, the second step is polymerizing the sulfur source with a dihalogenated aromatic compound to prepare a polyarylene sulfide.

The present disclosure is characterized in that a polyarylene sulfide having a high degree of polymerization is prepared at a high yield by further adding an amide-based compound in an optimum amount in a polymerization process of the second step in which the sulfur source and the dihalogenated aromatic compound are reacted.

In the second polymerization step, the amide-based compound is added in the reactor including the sulfur source together with the dihalogenated aromatic compound, and should be added in an amount of about 1.0 to about 2.0 equivalents based on 1 equivalent of the hydrosulfide of an alkali metal. When the amide-based compound is added within the above range, a polyarylene sulfide having excellent physical properties may be obtained without increasing the content of chlorine present in the polyarylene sulfide. Considering the excellent effect of controlling the input amount of the sulfur source and the dihalogenated aromatic compound, the amide-based compound may be added in the second step in an amount of about 1.2 equivalents or more to about 2.0 equivalents or less, about more than 1.35 equivalents to about 2.0 equivalents, about 1.4 equivalents or more to about 1.95 equivalents or less, or about 1.65 equivalents or more to about 1.95 equivalents or less.

In particular, since the amide-based compound contained in the sulfur source prepared in the first step may function as a co-solvent, the amide-based compound may be added in the second step in a molar ratio of water ($H_2O$) to the amide-based compound present in the polymerization system (a molar ratio of water/an amide-based compound) to be about 0.5 to about 0.85, more specifically about 0.5 to about 0.8, about 0.55 to about 0.8, or about 0.58 to about 0.75. This relates to the contents of the final amide-based compound and water present in the system during the polymerization reaction of the second step and a molar ratio thereof, and may be the water content and the molar ratio with respect to a total amount of the amide-based compound and water remaining in the sulfur source obtained by the dehydration reaction of the first step and the amide-based compound further added in the second step.

Herein, the content of the amide-based compound further added in the polymerization process of the second step is important because it eventually affects the molar ratio of water (H₂O) to the amide-based compound in the final polymerization reaction system. Therefore, when the content of the amide-based compound further added in the second step is about 1.0 equivalent or more to about 2.0 equivalents or less, about 1.2 equivalents or more to about 2.0 equivalents or less, about more than 1.35 equivalents to about 2.0 equivalents, about 1.4 equivalents or more to about 1.95 equivalents or less, or about 1.65 equivalents or more to about 1.95 equivalents or less, the molar ratio of water (H₂O) to the amide-based compound is maintained to be about 0.5 or more to about 0.85 or less, about 0.5 or more to about 0.8 or less, about 0.55 or more to about 0.8 or less, or about 0.58 or more to about 0.75 or less, thereby exhibiting a high molecular weight with a high yield.

As described above, the polymerization reaction of the sulfur source and the dihalogenated aromatic compound in the second step may be carried out in a solvent of an amide-based compound which is a polar aprotic organic solvent and stable to an alkali at a high temperature. Specific examples of the amide-based compound are as described above, and N-methyl-2-pyrrolidone (NMP) is preferable considering the reaction efficiency.

The dihalogenated aromatic compound usable for the preparation of the polyarylene sulfide is a compound in which two hydrogen atoms of an aromatic ring are substituted with halogen atoms. Specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenylsulfoxide, and dihalodiphenylketone, and any one or a mixture of two or more thereof may be used. In the dihalogenated aromatic compound, the halogen atom may be fluorine, chlorine, bromine or iodine. Among them, p-dichlorobenzene (p-DCB) may preferably be used in order to increase reactivity and suppress side reactions in the preparation of a polyarylene sulfide.

The dihalogenated aromatic compound may be added in an amount of about 0.8 to 1.2 equivalents based on 1 equivalent of the hydrosulfide of an alkali metal. When the dihalogenated aromatic compound is added within the above range, a polyarylene sulfide having excellent physical properties may be obtained without lowering the melt viscosity of the polyarylene sulfide to be prepared and increasing the content of chlorine present in the polyarylene sulfide. Considering the excellent effect of controlling the input amount of the sulfur source and the dihalogenated aromatic compound, the dihalogenated aromatic compound may be added in an amount of about 0.9 to about 1.1 equivalents.

Further, a step of lowering the temperature of the reactor containing the sulfur source to a temperature of about 150° C. or more and less than about 200° C. may be further included before the second step to prevent vaporization of the dihalogenated aromatic compound.

During the polymerization reaction, other additives such as a molecular weight regulator, a cross-linking agent and the like for controlling the polymerization reaction or the molecular weight may be further added in an amount not lowering physical properties and the yield of the polyarylene sulfide to be finally prepared.

The polymerization reaction of the sulfur source and the dihalogenated aromatic compound may be performed at a temperature of about 200° C. to about 300° C. Alternatively, the polymerization reaction may be carried out in a multi-step process while varying the temperature within the above-described range. Specifically, a first polymerization reaction may be performed at a temperature of about 200° C. to about 250° C., and then a second polymerization reaction may be continuously performed at a temperature higher than that of the first polymerization reaction, specifically at about 250° C. to about 300° C.

A reaction product prepared as a result of the above polymerization reaction is separated into an aqueous phase and an organic phase, and a polyarylene sulfide, which is a product of the polymerization reaction, is dissolved in the organic phase. Accordingly, a process for precipitation and separation of the prepared polyarylene sulfide may be optionally performed.

In particular, the precipitation of the polyarylene sulfide may be carried out by adding water to the reaction mixture in an amount of about 3 to 5 equivalents based on 1 equivalent of sulfur, and then cooling. When the water is added within the above range, the polyarylene sulfide may be precipitated with excellent efficiency.

The precipitated polyarylene sulfide may be optionally further subjected to washing, filtration and drying according to conventional methods.

As a specific preparation method of the polyarylene sulfide, following examples may be referred to. However, the preparation method of the polyarylene sulfide is not limited to this description. The preparation method may further include a step which is usually carried out in the technical field of the present invention, and the step(s) of the preparation method may be changed by the step(s) usually changeable.

Meanwhile, the process for preparing a polyarylene sulfide according to an embodiment of the present disclosure as described above may easily produce a polyarylene sulfide having a thermal property equal to or higher than that of the conventional method at an excellent yield.

Specifically, the polyarylene sulfide may be produced at a yield of about 83% or more, about 84% or more, or about 84.5% or more, and may have a melt flow rate (MFR) of about 200 g/10 min to 1000 g/10 min, about 250 g/10 min to 900 g/10 min, about 280 g/10 min to 800 g/10 min, or about 300 g/10 min to 700 g/10 min measured under a load of 5 kg in accordance with ASTM D 1238-10. In particular, the melt flow rate (MFR) may be maintained in the above-described range to improve processability in using the polyarylene sulfide by injection molding. Herein, the measuring method for the yield and the melt flow rate of the polyarylene sulfide is well known in the art, and specifically, Experimental Example 1 described later can be referred to.

The polyarylene sulfide may have a melting point ($T_m$) of about 270° C. to 300° C., and a crystallization point (TO of about 180° C. to 250° C. Herein, the melting point ($T_m$) and the crystallization point (TO of the polyarylene sulfide may be measured using differential scanning calorimeter (DSC, manufactured by TA instrument, TA Q2000). As the measuring method is well known in the art, a detailed description thereof will be omitted.

The polyarylene sulfide may have a weight average molecular weight (Mw) of more than about 10000 g/mol to about 30000 g/mol or less. Herein, the weight average molecular weight (Mw) of the polyarylene sulfide may be measured using gel permeation chromatography (GPC). For example, it may be measured using PL-GPC220 (Waters) as a GPC apparatus and PLgel MIX-B 300 mm length column (Polymer Laboratories). The measuring method is well known in the art, and will not be described in detail.

Hereinafter, the present invention will be described in more detail with reference to the following preferred examples. However, these examples are for illustrative purposes only, and the invention is not intended to be limited by these examples.

EXAMPLES

Example 1

A dehydration reaction (first step) and a polymerization reaction (second step) were performed according to the method as shown in the FIGURE to prepare a polyphenylene sulfide (PPS) polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalents of sodium acetate ($CH_3COONa$) powder, 1.65 equivalents of N-methyl-2-pyrrolidone (NMP) and 4.72 equivalents of deionized water (DI water) were added to the reactor. At this time, the solid reagent was added first, followed by NMP, DI water. First, a nitrogen atmosphere was created in the reactor, and then the nitrogen line was removed. While slowly opening a dehydration valve and raising the temperature, a dehydrated reactant started flowing out from the inside of the reactor, and it was passed through a condenser and liquefied to be collected as a dehydration liquid. At this time, the reactor was heated to 205° C. for 1 hour while stirring at 150 rpm to perform a dehydration reaction. Thereafter, the dehydration valve was closed and the heater was turned off to lower the temperature below 180° C., and the dehydration reaction was completed. A remaining mixture obtained after the dehydration reaction was obtained as a sulfur source. A molar ratio of NMP/S immediately after the dehydration reaction was calculated to be 2.91. Herein, the NMP concentration (v/v %) in the dehydration liquid removed to the outside during the dehydration reaction was 32.1% as measured by gas chromatography.

(2) The Polymerization Reaction

After raising the temperature of the reactor containing the sulfur source obtained by the dehydration reaction to 180° C., 1.04 equivalents of para-dichlorobenzene (p-DCB) dissolved in 1.65 equivalents of NMP was introduced into the reactor using a metering pump. In addition, a molar ratio of $H_2O/NMP$ in the polymerization reaction of the second step was calculated to be 0.71. Then, when the addition was completed, the obtained mixed solution was heated to 230° C. to react for 2 hours, and further heated for 20 minutes to 250° C. to react for another 2 hours. After the reaction was completed, 3 equivalents of deionized water (DI water) was added into the reactor based on 1 equivalent of sulfur present in the reactor, and the temperature was sufficiently lowered to recover the resultant. When the pressure became normal pressure after cooling at room temperature, the reactor was opened to obtain a PPS slurry as a reaction product. The slurry was washed sequentially with a mixed solution of deionized water and NMP (mixed volume ratio=1:1), and deionized water, followed by filtration. Subsequently, it was washed with 0.4% acetic acid aqueous solution at 90° C., followed by filtration. Thereafter, it was washed with acetone at 50° C., then filtered, and again washed with deionized water at 90° C. three times until the pH reached 7, followed by filtration. The washed polyphenylene sulfide was recovered by drying in a vacuum oven at 150° C. for 5 hours. The yield of the polyphenylene sulfide recovered was 94.02%.

Example 2

The dehydration reaction of the first step and the polymerization reaction of the second step were performed to prepare and recover a polyphenylene sulfide in the same manner as in Example 1, except that the content of NMP further added with para-dichlorobenzene (p-DCB) was changed to 1.95 equivalents in (2) the polymerization reaction of Example 1.

Herein, the NMP concentration (v/v %) in the dehydration liquid removed to the outside during the dehydration reaction of the first step was 31.2% as measured by gas chromatography. In addition, a molar ratio of $H_2O/NMP$ in the polymerization reaction of the second step was calculated to be 0.59. Finally, after completion of the polymerization reaction of the second step, the yield of the polyphenylene sulfide recovered was 90.04%.

Example 3

The dehydration reaction of the first step and the polymerization reaction of the second step were performed to prepare and recover a polyphenylene sulfide in the same manner as in Example 1, except that the content of sodium acetate ($CH_3COONa$) powder was changed to 0.3 equivalents in (1) the dehydration reaction of Example 1.

Herein, the NMP concentration (v/v %) in the dehydration liquid removed to the outside during the dehydration reaction of the first step was 30.2% as measured by gas chromatography. In addition, a molar ratio of $H_2O/NMP$ in the mixture was calculated to be 0.60. Finally, after completion of the polymerization reaction of the second step, the yield of the polyphenylene sulfide recovered was 89.51%.

Example 4

The dehydration reaction of the first step and the polymerization reaction of the second step were performed to prepare and recover a polyphenylene sulfide in the same manner as in Example 1, except that the content of sodium acetate ($CH_3COONa$) powder was changed to 0.3 equivalents in (1) the dehydration reaction and the content of NMP further added with para-dichlorobenzene (p-DCB) was changed to 1.95 equivalents in (2) the polymerization reaction of Example 1.

Herein, the NMP concentration (v/v %) in the dehydration liquid removed to the outside during the dehydration reaction of the first step was 31.5% as measured by gas chromatography. In addition, a molar ratio of $H_2O/NMP$ in the polymerization reaction of the second step was calculated to be 0.62. Finally, after completion of the polymerization reaction of the second step, the yield of the polyphenylene sulfide recovered was 90.25%.

Comparative Example 1

The dehydration reaction of the first step and the polymerization reaction of the second step were performed to prepare and recover a polyphenylene sulfide in the same manner as in Example 1, except that the content of NMP further added with para-dichlorobenzene (p-DCB) was changed to 1.45 equivalents in (2) the polymerization reaction of Example 1.

Herein, the NMP concentration (v/v %) in the dehydration liquid removed to the outside during the dehydration reaction of the first step was 31.4% as measured by gas chromatography. In the polymerization reaction of the second step, a molar ratio of NMP/S was calculated to be 2.91, and a molar ratio of H$_2$O/NMP was calculated to be 0.87. Finally, after completion of the polymerization reaction of the second step, the yield of the polyphenylene sulfide recovered was 92.24%.

Comparative Example 2

The dehydration reaction of the first step and the polymerization reaction of the second step were performed to prepare and recover a polyphenylene sulfide in the same manner as in Example 1, except that the content of sodium acetate (CH$_3$COONa) powder was changed to 0.2 equivalents in (1) the dehydration reaction of Example 1.

Herein, the NMP concentration (v/v %) in the dehydration liquid removed to the outside during the dehydration reaction of the first step was 23.7% as measured by gas chromatography. In the polymerization reaction of the second step, a molar ratio of NMP/S was calculated to be 2.91, and a molar ratio of H$_2$O/NMP was calculated to be 0.4. Finally, after completion of the polymerization reaction of the second step, the yield of the polyphenylene sulfide recovered was 82.19%.

Comparative Example 3

The dehydration reaction of the first step and the polymerization reaction of the second step were performed to prepare and recover a polyphenylene sulfide in the same manner as in Example 1, except that the content of NMP further added with para-dichlorobenzene (p-DCB) was changed to 1.45 equivalents in (2) the polymerization reaction of Comparative Example 2.

Herein, the NMP concentration (v/v %) in the dehydration liquid removed to the outside during the dehydration reaction of the first step was 34.31% as measured by gas chromatography. In the polymerization reaction of the second step, a molar ratio of NMP/S was calculated to be 2.91, and a molar ratio of H$_2$O/NMP was calculated to be 0.87. Finally, after completion of the polymerization reaction of the second step, the yield of the polyphenylene sulfide recovered was 78.8%.

Experimental Example 1

Physical properties of the polyphenylene sulfides prepared in Examples and Comparative Examples were measured by the following method, and the results are shown in Table 1 below.

1) Yield

After weighing the dried polyphenylene sulfide (PPS) with an electronic balance, the number of moles was calculated based on a repeating unit value (108.16 g/mol). That is, the yield of the polymer actually recovered (mol/mol %) was calculated based on the number of moles of sodium sulfide added less or the number of moles of para-dichlorobenzene.

In particular, in order to measure the yield more precisely, the conventional method of measuring the yield without completely removing substances that are well dissolved in organic solvents or hot water from the slurry was not applied, wherein the conventional method only performs sieving after diluting the polyphenylene sulfide (PPS) slurry obtained after polymerization with water at room temperature for washing. Instead, the slurry was washed with hot washing water and hot organic solvents at least three times, and then dried in a high temperature vacuum oven for one day to measure the yield.

2) Melt Flow Rate (MFR)

The melt flow rate (MFR) of the polyphenylene sulfide resins prepared in Examples and Comparative Examples was measured in accordance with ASTM D1238-10.

At this time, using a Gottfert MI-4 apparatus, each polyphenylene sulfide resin was placed under a load of 5 kg at a temperature of 315° C., and the molten material was weighed by the timed segments of the extrudate. Then, an extrusion rate was calculated in g/10 min unit.

However, in the polyphenylene sulfide resins of Comparative Examples 1 and 3, the melt flow rate could not be measured under a load of 5 kg, that is, the molecular weight was too low. Accordingly, a value measured under a load of 2.16 kg is shown as a reference.

TABLE 1

| | Dehydration | | | Polymerization | | Properties of PPS | |
|---|---|---|---|---|---|---|---|
| | NaOAc input (eq) | NMP input (eq) | NMP conc. in dehydration liquid (v/v %) | NMP input (eq) | A molar ratio of H$_2$O/NMP in polym. | Yield (%) | MFR (g/10 min) |
| Ex. 1 | 0.44 | 1.65 | 32.1 | 1.65 | 0.71 | 94.02 | 300.4 |
| Ex. 2 | 0.44 | 1.65 | 31.2 | 1.95 | 0.59 | 90.04 | 311.2 |
| Ex. 3 | 0.3 | 1.65 | 30.2 | 1.65 | 0.60 | 89.51 | 486.7 |
| Ex. 4 | 0.3 | 1.65 | 31.5 | 1.95 | 0.62 | 90.25 | 400.5 |
| Comp. Ex. 1 | 0.44 | 1.65 | 31.4 | 1.45 | 0.87 | 92.24 | — (under a load of 2.16 kg, 347.9) |
| Comp. Ex. 2 | 0.2 | 1.65 | 23.7 | 1.35 | 0.40 | 82.19 | 1225.9 |
| Comp. Ex. 3 | 0.2 | 1.65 | 34.3 | 1.45 | 0.87 | 78.8 | — (under a load of 2.16 kg, 382.53) |

First, in the Table 1, the input amount of sodium acetate (NaOAc) and N-methyl-2-pyrrolidone (NMP) in the dehydration process, and the input amount of N-methyl-2-pyrrolidone (NMP) in the polymerization process are all expressed in molar equivalents (eq) based on 1 equivalent of sulfur source.

As shown in Table 1, a polyarylene sulfide having a high molecular weight could be prepared at a high yield by optimizing the content and molar ratio of the amide-based compound in the polymerization step.

The invention claimed is:

1. A process for preparing a polyarylene sulfide, comprising:
a first step of preparing a sulfur source comprising dehydrating a hydrosulfide of an alkali metal and a hydroxide of an alkali metal in the presence of an organic acid salt of an alkali metal in a mixed solvent of water and an amide-based compound; and
a second step of preparing a polyarylene sulfide by adding a dihalogenated aromatic compound and an amide-based compound to a reactor containing the sulfur source and performing a polymerization reaction;
wherein the amide-based compound added in the second step is added in an amount of 1.0 to 2.0 equivalents based on 1 equivalent of the hydrosulfide of an alkali metal in the second step, and a molar ratio of water to the amide-based compound present in the polymerization reaction system of the second step is 0.5 to 0.85, and
wherein the sulfur source prepared in the first step contains 25% (v/v) to 35% (v/v) of the amide-based compound based on a total volume of the mixed solvent of water and amide-based compound.

2. The process for preparing a polyarylene sulfide according to claim 1, wherein the amide-based compound added in the first step is added in an amount of 1.0 to 2.0 equivalents based on 1 equivalent of the hydrosulfide of an alkali metal in the first step.

3. The process for preparing a polyarylene sulfide according to claim 1, wherein the water added in the first step is added in an amount of 1 to 8 equivalents based on 1 equivalent of the amide-based compound in the first step.

4. The process for preparing a polyarylene sulfide according to claim 1, wherein the organic acid salt of an alkali metal is used in an amount of 0.01 to 1.0 equivalents based on 1 equivalent of the hydrosulfide of an alkali metal.

5. The process for preparing a polyarylene sulfide according to claim 1, wherein the organic acid salt of an alkali metal comprises lithium acetate, sodium acetate, or a mixture thereof.

6. The process for preparing a polyarylene sulfide according to claim 1, wherein the dehydration reaction in the first step is performed at a temperature of 130° C. to 220° C.

7. The process for preparing a polyarylene sulfide according to claim 1, wherein the dihalogenated aromatic compound comprises at least one selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenylsulfoxide, and dihalodiphenylketone.

8. The process for preparing a polyarylene sulfide according to claim 1, wherein the dihalogenated aromatic compound is added in an amount of 0.8 to 1.2 equivalents based on 1 equivalent of the hydrosulfide of an alkali metal.

9. The process for preparing a polyarylene sulfide according to claim 1, wherein the polymerization reaction in the second step is performed at a temperature of 200° C. to 300° C.

10. The process for preparing a polyarylene sulfide according to claim 1, wherein the polyarylene sulfide is produced at a yield of 80 mol % or more, and has a melt flow rate (MFR) of 200 g/10 min to 1000 g/10 min measured under a load of 5 kg in accordance with ASTM D 1238-10.

11. The process for preparing a polyarylene sulfide according to claim 1, further comprising a step of lowering the temperature of the reactor containing the sulfur source to a temperature of 150° C. to 200° C. before the second step.

12. The process for preparing a polyarylene sulfide according to claim 1, further comprising a step of adding water to a reaction mixture in an amount of 3 to 5 equivalents based on 1 equivalent of sulfur after the polymerization reaction of the second step and then cooling.

13. The process for preparing a polyarylene sulfide according to claim 12, further comprising a step of washing the reaction mixture using water and an amide-based compound after a cooling step and then drying.

* * * * *